United States Patent Office 3,059,439
Patented Oct. 23, 1962

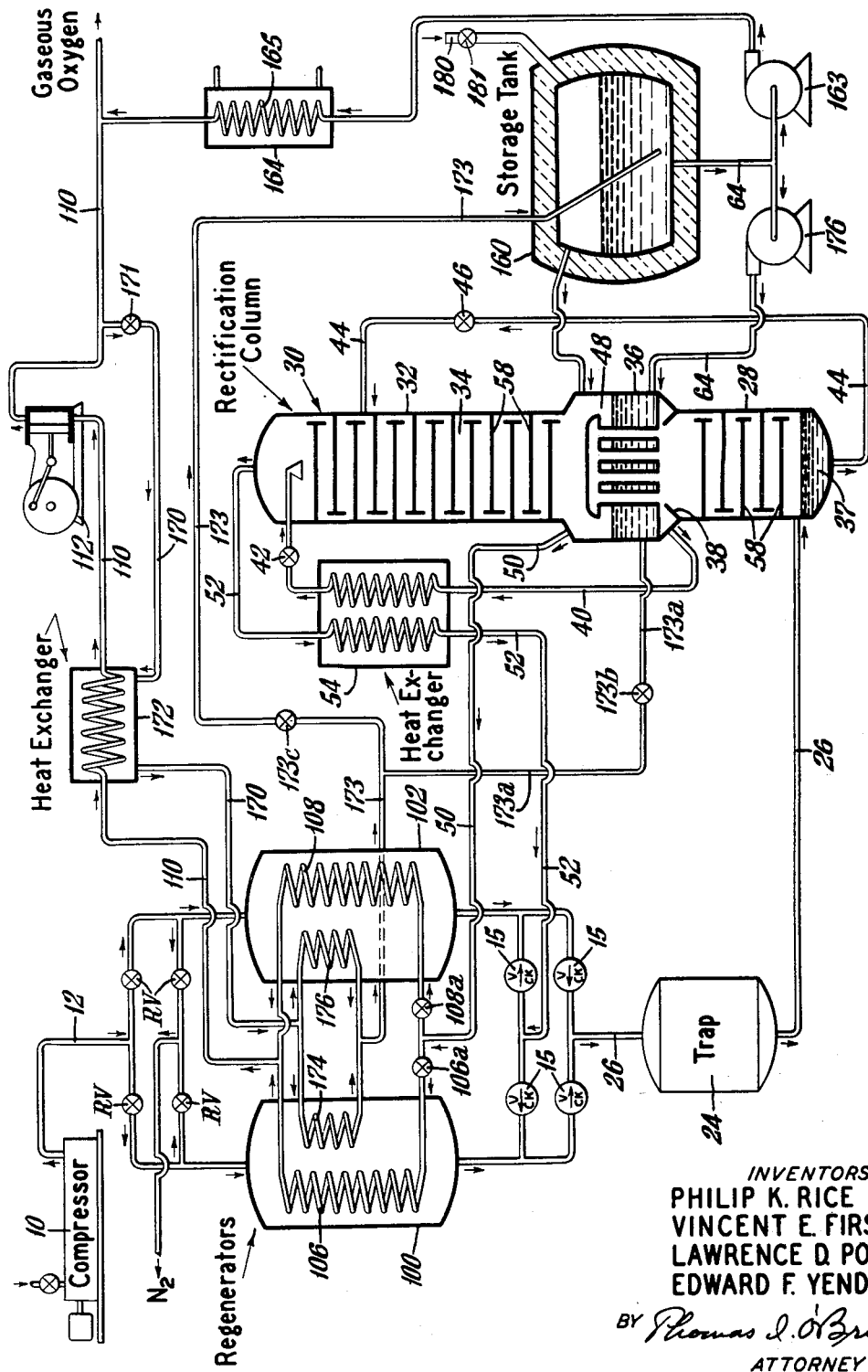

3,059,439
PROCESS AND APPARATUS FOR SEPARATING
GAS MIXTURES
Vincent E. First, Tonawanda, Lawrence D. Potts, Eggertsville, Philip K. Rice, White Plains, and Edward F. Yendall, Kenmore, N.Y., assignors to Union Carbide Corporation, a corporation of New York
Original application Jan. 4, 1956, Ser. No. 557,260, now Patent No. 2,908,144, dated Oct, 13, 1959. Divided and this application Aug. 24, 1959, Ser. No. 835,536
9 Claims. (Cl. 62—13)

This invention relates to an improved process and apparatus for the low-temperatures separation of low boiling point gas mixtures such as air, for example, into higher and lower boiling point components, and it particularly concerns improvements resulting in the continuous removal from separation systems of higher boiling impurities separated in such systems by refrigeration. This invention is a division of Serial No. 557,260, now U.S.P. 2,908,144, filed January 4, 1956.

Gas mixtures containing higher boiling point impurities, such as air, which contain water vapor and carbon dioxide, must be freed of such impurities when the gas mixture is to be separated into components by low temperature rectification. An economical method of eliminating these higher boiling impurities while efficiently cooling the gas mixture is to employ periodically reversed heat exchange units having a path in which gas mixture being cooled is passed in one direction therethrough and in which separation product being warmed passes in the opposite direction therethrough when the gas mixture has ceased the flow therein, the gas mixture flow and separation product flow being periodically interchanged to effect alternate deposition along the flow path of a major part of the so-called higher boiling impurities from the gas mixture and re-evaporation of such deposited impurities into the outflowing separation product. This is of particular economy when the gas mixture does not need to be compressed to high pressure causing excessive compression energy loss from flow reversal blowdown. However, one of the difficulties that arises in the use of such periodically reversed heat exchange units is that when the inflowing mixture and outflowing product are in balance, such higher boiling point impurities cannot normally be removed at the rate at which they are deposited in the heat exchange path and hence gradually accumulate in and block such path.

It is known that in such systems the temperature difference between incoming air and outgoing separation product increases toward the cold end of the heat exchange unit because of the greater specific heat of the compressed air at the lower temperatures. As a result of this temperature difference, there is also such a difference in the vapor pressure of the impurities during condensation and re-evaporation that the condensate cannot be removed by outgoing product completely at the rate at which it was deposited. This undesirable condition can be remedied by passing a greater mass of cold outflowing gas than incoming air through at least the colder part of the heat exchange unit to offset the greater specific heat of the compressed air and to reduce the temperature difference between the air and outflowing gas in the region of impurity deposition. In this way the temperature of the separation product passing through the reversing heat exchange path will be sufficiently close to the temperature of the air passed previously therethrough that it has sufficient capacity to reevaporate all the condensate deposited therein.

The periodically reversing heat exchange unit is generally of two varieties: a reversing passage heat exchanger and a cold accumulator or regenerator. As herein used, a heat exchange unit is intended to comprehend a single reversing passage heat exchanger or regenerator of two or more such devices which together form a flow arrangement for effecting heat exchange between incoming air and outgoing products.

The general purpose of this invention, therefore, is to provide an improved method of thermally unbalancing air cleaning and cooling periodically reversed heat exchange units of low temperature air separation systems by utilization of refrigeration available in a body of stored cold liquid accessible thereto.

A specific object of this invention is the provision of an improved method of unbalancing such heat exchange units which results in substantially complete elimination of precipitated higher boiling impurities from such units continuously during operation of the system.

In accordance with the present invention, unbalance is achieved by utilizing the refrigeration available in a quantity of a cold substance other than a product of the immediate separation in the cold end of the heat exchange unit to adjust the temperature difference between incoming air and outgoing product. To achieve self-cleaning, the substance added must be sufficient to offset the difference in the specific heats of the incoming air and outgoing product in the region of the heat exchange unit where carbon dioxide occurs and so effect the reduction in the cold end temperature difference required for self-cleaning; i.e. complete re-evaporation in the reversing path of the heat exchanger by outgoing product of carbon dioxide precipitated from the incoming air during its passage through said path.

In one application of the present invention, the mass of outwardly flowing gas passing through at least the cold end of the air cooling and cleaning heat exchange unit of an air separation system is made to exceed the mass of incoming air passing through the same unit by adding to one of the effluent streams a quantity of cold gas other than a product of the immediate separation but having a composition similar to the separation product of such stream.

In achieving self-cleaning the outgoing product mass can be made to exceed incoming air mass either continuously or cyclically so long as the average unbalance is sufficient for self-cleaning. In an oxygen producing plant, the cold substance is preferably oxygen and is made up wholly or in part of oxygen that is derived from a store of liquid oxygen shipped to the plant from a large central plant and generally made available for supplying part of the oxygen demand when the plant cannot meet the demand and/or, if the plant has inadequate or no mechanical refrigeration-producing devices, for respectively supplying part or all of the low-temperature refrigeration required of the plant.

In one aspect of the invention where stored oxygen liquid is used to supply refrigeration to the plant, the oxygen can be mixed with the oxygen liquid product of the rectification, reboiled therewith, thereby giving up its refrigeration to the system, and passed with the oxygen make of the separation through an oxygen product pass in the heat exchange unit in such a manner to increase the outflowing gas mass. This results in greater outgoing gas mass flow than incoming air mass flow through the colder end of the heat exchange unit. The amount of liquid oxygen supplied for refrigeration purposes will not in many cases be enough to satisfy the requirements for self-cleaning, and in such cases, additional oxygen must be provided over and above the refrigeration requirements. Additional oxygen for self-cleaning may be added as a gas or as a liquid, provided in the latter instance that heat is made available to evaporate the liquid. In a preferred practice of the invention, where liquid addition for refrigeration purposes is insufficient for self-cleaning, the balance of excess outgoing gas required for self-cleaning is made up in a major portion as oxygen make returned from the warm end of the heat exchange system to the reboiling zone of the rectification after passage through the oxygen supply line compressor and in a minor portion as added liquid.

Alternatively, oxygen may be returned from the warm end of the heat exchange system or from an intermediate point thereof by a separate blower or compressor.

In another aspect of the present invention, the unbalance cold outflowing gas is made up wholly or in part by evaporation from a cold liquid storage tank. The stored liquid means can be any liquid having the necessary refrigeration, such as nitrogen, air, or oxygen, but more commonly will be liquid oxygen held in a storage tank used in conjunction with the gas separation plant in providing the gas demand required. Vapor available from pump priming can also be used and may be considered as part of the same source; viz. evaporation from the storage tank. The storage tank may be used for supplying a product gas during peak periods when the separation plant supplies only a base or steady supply, for supplying liquid to meet at least a part of the external refrigeration requirements of the separation system, or both. The vapor available from the storage tank may be the normal evaporation resulting from heat leak or it may be the normal evaporation together with vapor resulting from the forced evaporation, such as, for example, the vapor resulting from the introduction of a gas of the same composition such as, for example, warm compressed oxygen in the oxygen consumer supply line, into the liquid of the storage tank.

Other objects, features and advantages of the present invention will become apparent in the following description of the accompanying drawings in which:

The drawing is a schematic flow diagram illustrating an exemplary air separation plant adapted for the practice of the present invention.

Referring now to the drawing, the apparatus includes a compressor 10 which preferably compresses the air to a pressure of about 70 p.s.i.g. and delivers the air into a conduit 12 leading to the warm end of a pair of switching regenerators 100 and 102 for cooling incoming air with outgoing products. Compressed air in supply line 12 is passed alternately by reversing valves RV through regenerators 100 and 102, with the off-stream regenerator being purged and cooled by outflowing nitrogen product. Outgoing oxygen is preferably divided and passed in continuous flow through both regenerators in embedded passages 106 and 108. Air which has been freed of moisture and carbon dioxide in the regenerators is conducted by conduit 26 through an adsorbent trap 24 wherein residual hydrocarbon impurities and carbon dioxide particles are removed and thence to the lower end of the high pressure rectification column 28 of a two-stage rectification column indicated generally at 30.

The air rectification apparatus may be of customary construction and, in addition to the high pressure rectification or lower column 28, includes an upper, low pressure rectification column 32 having a rectifying section 34 and a reboiler section 36 at the lower end thereof which closes the high pressure column 28 and separates it from the upper column. The reboiler 36 operates in a customary manner to condense vapors rising in column 28, producing reflux for the high pressure column and also liquid nitrogen that is collected on a shelf 38 directly under part of the reboiler 36. The liquid nitrogen from the shelf 38 is throttled to a lower pressure and passed to the top of the upper column through a conduit 40 having a throttle valve 42. Oxygen-enriched liquid collected in a "kettle" 37 of the lower column is transferred to an intermediate part of the upper column 32 through a conduit 44, the higher pressure liquid being throttled to a low pressure by throttle valve 46 in conduit 44 before it is delivered into the upper column. The liquids transferred to the upper column provide reflux and are further rectified to obtain a cold, gaseous nitrogen product at the top part thereof and an oxygen product of desired purity at the lower part thereof. Oxygen-enriched liquid falling from the lowermost tray of the upper column passes into a liquid oxygen collecting space 48 of the reboiler 36 wherein it is vaporized by heat exchange with condensing fluid on the tube side of the reboiler. Part of this vapor is withdrawn from the rectification apparatus as oxygen-make product through conduit 50 which delivers it to the cold end of the regenerators 100 and 102 for passage through passageways 106 and 108 and then into the oxygen make supply line 110 having a compressor 112 interposed therein for raising the pressure of the gaseous oxygen to consumer line pressure. The remainder is passed into the rectifying section 34 to provide refluxing vapor for the low pressure rectification. The nitrogen product of the rectification is withdrawn from the upper column 32 through a conduit 52, which delivers the cold, gaseous effluent to check valves 15 at the cold end of the regenerators 100 and 102. The nitrogen product may be passed through conduit 52 and heat exchanger 54 to superheat the nitrogen effluent and at the same time subcool the shelf nitrogen liquid sufficiently to minimize flash-off when it is throttled to a lower pressure in valve 42. The rectification chambers 28 and 34 may be provided with the usual gas and liquid contact surfaces, such as trays 58.

Although it has been described that the outgoing oxygen stream is split and passed through both regenerators simultaneously it should be understood that all of the outgoing oxygen could be passed into a single stream alternately through one regenerator and then the other, either in phase with the switching cycle of the nitrogen and air or out of phase therewith. For example, the outgoing oxygen stream can be passed through each regenerator during the last half of the air-in-flow half cycle and during the first half of the nitrogen-out-flow half cycle. For these purposes there is provided control valves 106a and 108a, the opening and closing of which may be timed to effect any desired oxygen flow.

Part of the warm compressed oxygen product is returned as required either to the oxygen reboiler 36 or to the storage tank 160 to provide sufficient cold oxygen gas to satisfy the heat exchange unbalancing needs of the plant. For this purpose there is provided a conduit 170 controlled by valve 171 through which a part of the warm oxygen product is withdrawn from the oxygen supply conduit 110 after passage through the oxygen make compressor 112. The withdrawn gas is passed in heat exchange with the oxygen make stream prior to compression in a heat exchanger 173 and is then partly recooled by passage through coils 174 and 176 in the warm end of the regenerators 100 and 102, respectively, the warm oxygen passing through such warm ends in the same direction of flow as that of the air flow. The flow through the regenerators may be in parallel as shown or it may be alternately through one regenerator and then the other. The partly recooled clean oxygen gas is then delivered either into the oxygen reboiler 36 by conduit 173a having control valve 173b or into the storage tank 160 by conduit 173 which terminates below the liquid level of the tank so as to cause the relatively warm gas to bubble through the liquid in the tank and thereby increase its rate of evaporation. When flow of return oxygen is to the reboiler, valve 173c in conduit is closed. Storage tank evaporation, together with oxygen make gas circulated through the storage tank, is added to the products of the separation by passage directly into the oxygen make conduit 50 or by delivery into the gas phase of the oxygen reboiler 36 as shown. In this way a positive supply of unbalance gas in excess of the oxygen used for supplying low temperature refrigeration is made available for meeting the unbalance needs of the separation system. By bubbling the warm compressed oxygen through the cold liquid oxygen in the storage tank, the amount of refrigeration lost in achieving unbalance is minimized, for the excess cold gas needed is supplied in a minor portion as evaporated liquid and in a major portion of warm compressed gas which is recooled to saturation by the liquid evaporation.

In the embodiment of the drawing, liquid from the storage tank 169 is fed to the rectification reboiler 36 for refrigeration purposes by a pump 176 and liquid oxygen from an external source is introduced through conduit 180 having control valve 181 therein. It should be understood that the low temperature refrigeration supplied by the feeding of stored liquid to the rectification is not necessarily the entire low temperature refrigeration requirements of the plant but may form only a part of such requirements as in the case where mechanical refrigeration producing apparatus is also present in the system to supply part of the refrigeration requirements.

It should also be understood that the stored liquid which is supplied to meet part of or all the low-temperature refrigeration required by the rectification need not be stored in the same body or tank as that supplying the excess gas to meet peak demands. Hence, as used herein, "storage body" is intended to comprehend both storage bodies if separate ones are used. The term "storage body" is also intended to cover an oversized reboiler, for cold liquid from a separate source could be introduced directly into and stored in such a reboiler. Changes in the details of the systems herein disclosed may be made without departing from the scope of the invention as defined in the following claims.

What is claimed is:

1. In a process for the low temperature separation of air in a rectification zone in which air to be cooled and nitrogen product to be warmed are alternately passed in opposite directions through a reversing flow path in a heat exchange zone to effect alternate deposition along the flow path of water and carbon dioxide impurities from the inflowing air and re-evaporation of such deposited impurities into the outflowing nitrogen product and in which oxygen product to be warmed is passed concurrently with the nitrogen product flow through a non-reversing flow path in said heat exchange zone, the improvement comprising the steps of providing an independent storage body of liquid oxygen received from a source separate from the rectification; utilizing a first oxygen liquid from said body to supply low temperature refrigeration to the rectification zone thereby vaporizing at least a portion of the first oxygen; withdrawing a second oxygen liquid from said independent storage body and passing such liquid to a consumer supply line when the oxygen demand exceeds the oxygen separated in the rectification zone; withdrawing oxygen vapor from the rectification zone, said oxygen vapor being supplied at least in part by vaporized first oxygen liquid; passing said oxygen vapor through said non-reversing flow path along at least the colder region of said heat exchange zone as said oxygen product which is thereby warmed; withdrawing a portion of the warmed oxygen vapor and recooling such vapor portion by bubbling through the liquid in said independent storage body.

2. A process according to claim 1 in which the withdrawn portion of oxygen vapor is passed through a separate path in the heat exchange zone extending along at least the warmer region thereof prior to said recooling.

3. A process according to claim 1 in which oxygen vapor resulting from evaporation of liquid in said independent storage body is passed through at least the colder region of said heat exchange zone in said non-reversing flow path.

4. A process according to claim 1 in which said second oxygen liquid is pumped to consumer line pressure and vaporized prior to said passing to said said consumer line, and oxygen vapor resulting from evaporation of liquid in said independent storage body is passed through at least the colder region of said heat exchange zone in said non-reversing flow path.

5. Apparatus for the low temperature separation of air by rectification comprising a rectification column; a reversible heat exchange zone having at least two reversing passageways through which air to be cooled and nitrogen product to be warmed are alternately flowed in opposite directions to effect deposition along the passageways of water and carbon dioxide impurities from the incoming air and re-evaporation of such impurities into the outflowing nitrogen product, and at least one non-reversing passageway thermally associated with at least one of said reversing passageways for warming a first oxygen product by heat exchange with the nitrogen product; an independent storage body of liquid oxygen received from a source separate from the rectification column; means for withdrawing a first oxygen liquid from said independent storage body and passing such liquid to said rectification column to supply low temperature refrigeration therefor and simultaneously vaporize at least a portion of said first oxygen; means for withdrawing oxygen vapor from said rectification column and passing such vapor to the cold end of said non-reversing passageway as said first oxygen product; means for discharging and dividing the warmed first oxygen product from said non-reversing passageway; and means for introducing a divided portion to said warmed first oxygen product in the lower part of said independent storage body of liquid oxygen for bubbling therethrough.

6. Process according to claim 1 including the steps of compressing said oxygen product after said passage through the non-reversing path and prior to said withdrawal and said bubbling, and partially recooling the compressed withdrawn oxygen product portion by heat exchange with the uncompressed oxygen product.

7. Process according to claim 1 including the steps of compressing said oxygen product after said passage through the non-reversing path and prior to said withdrawal and said bubbling; directing a first part of the compressed oxygen product to said consumer supply lines; partially recooling a second part of the compressed oxygen product as the withdrawn portion by heat exchange with the uncompressed oxygen product.

8. Process according to claim 7 wherein the second part of said compressed oxygen product is further recooled by heat exchange with the warm-end of said non-reversing flow path, and a portion of the recooled second part is passed to the rectification.

9. Apparatus according to claim 5 including means for compressing the warmed first oxygen product after flow through said non-reversing passageway; means for at least partially cooling the compressed first oxygen product by heat exchange with the uncompressed warm first oxygen product; means for further cooling at least a part of said compressed first oxygen product in said reversible heat exchange zone; and means for passing at least a portion of the compressed and further cooled first oxygen product to said rectification column.

References Cited in the file of this patent

UNITED STATES PATENTS

| 2,513,306 | Garbo | July 4, 1950 |
| 2,664,718 | Rice | Jan. 5, 1954 |
| 2,690,655 | Etienne | Oct. 5, 1954 |
| 2,741,094 | Schuftan | Apr. 10, 1956 |
| 2,785,548 | Becker | Mar. 19, 1957 |
| 2,881,595 | Fetterman | Apr. 14, 1959 |

FOREIGN PATENTS

| 884,203 | Germany | June 11, 1954 |
| 968,603 | France | Dec. 1, 1950 |